United States Patent [19]

Cousineau

[11] Patent Number: 5,305,585
[45] Date of Patent: * Apr. 26, 1994

[54] SYSTEM FOR UPROOTING AQUATIC PLANTS

[76] Inventor: Ronald J. Cousineau, 1875 Long Pointe Dr., Bloomfield Hills, Mich. 48302

[*] Notice: The portion of the term of this patent subsequent to Oct. 6, 2009 has been disclaimed.

[21] Appl. No.: 915,054

[22] Filed: Jul. 16, 1992

Related U.S. Application Data

[63] Continuation-in-part of Ser. No. 740,715, Aug. 6, 1991, Pat. No. 5,152,126.

[51] Int. Cl.$^5$ .................... A01D 44/00; A01D 7/02
[52] U.S. Cl. ........................... 56/8; 37/344; 56/400.11; 239/754
[58] Field of Search ............ 56/8, 9, 400.11, 400.12; 37/75, 78, 79, 11, 119, 120; 239/159, 754; 294/49, 52, 19.2; 209/417, 418

[56] References Cited

U.S. PATENT DOCUMENTS

| | | | |
|---|---|---|---|
| 1,227,478 | 5/1917 | Meuler | 56/400.11 |
| 1,650,428 | 11/1927 | Chinneck | 294/52 |
| 1,782,497 | 11/1930 | Anderson | 37/119 |
| 3,019,535 | 2/1962 | Talbott et al. | 37/78 |
| 3,295,231 | 1/1967 | Talbott | 37/78 |
| 3,402,487 | 9/1968 | Vaughan et al. | 37/78 |
| 3,599,354 | 8/1971 | Larson | 37/78 |
| 3,979,146 | 9/1976 | Berg | 56/400.11 |
| 4,009,666 | 3/1977 | Russell et al. | 239/159 |
| 4,190,279 | 2/1980 | Sguazzin | 37/119 X |
| 4,768,331 | 9/1988 | Jones | 56/8 |
| 4,774,804 | 10/1988 | Sands | 56/400.04 |
| 4,828,690 | 5/1989 | Montez | 209/418 |
| 4,852,337 | 6/1989 | Peterson | 56/8 |
| 4,930,706 | 6/1990 | Merlin | 239/754 |

FOREIGN PATENT DOCUMENTS

| | | | |
|---|---|---|---|
| 899079 | 5/1972 | Canada. | |
| 557697 | 1/1975 | Switzerland. | |
| 1290060 | 2/1987 | U.S.S.R. | 56/9 |

OTHER PUBLICATIONS

"Aqua Weed Rake" Brochure of Handy Marketing Co., Grand Rapids, Michigan, dated prior to Aug. 6, 1991.
"Water-Weeder" Harvester Brochure of Waterside Products Corp., Lake Mahopac, N.Y., dated prior to Aug. 6, 1991.
"TTG Excavating" Brochure of Joseph Trierwiler, Howell, Mich., dated prior to Aug. 6, 1991.

*Primary Examiner*—David J. Bagnell
*Attorney, Agent, or Firm*—Peter D. Keefe

[57] ABSTRACT

An aquatic plant uprooter for ridding a body of water of undesirable plantlife, composed of a hollow handle, a hollow discharge member connected at right angles to the handle, and a plurality of regularly spaced apart nozzles connected with the discharge member. A flexible hose connects a distal end of the handle to a water pump. The handle serves as a fluidic conduit for water from the pump to flow into the discharge member, which in turn, serves as a fluidic conduit for water from the handle to flow into the nozzles. The nozzles are structured, located and mutually spaced so that a jet of water emerges from each, which collectively disturbs the soil of a body of water so as to uproot aquatic plants by undermining their anchorage in the soil. The soil-freed plants may be directly accumulated in a net member attached to the handle and discharge member, or may be collected by use of a separate rake-net system.

12 Claims, 4 Drawing Sheets

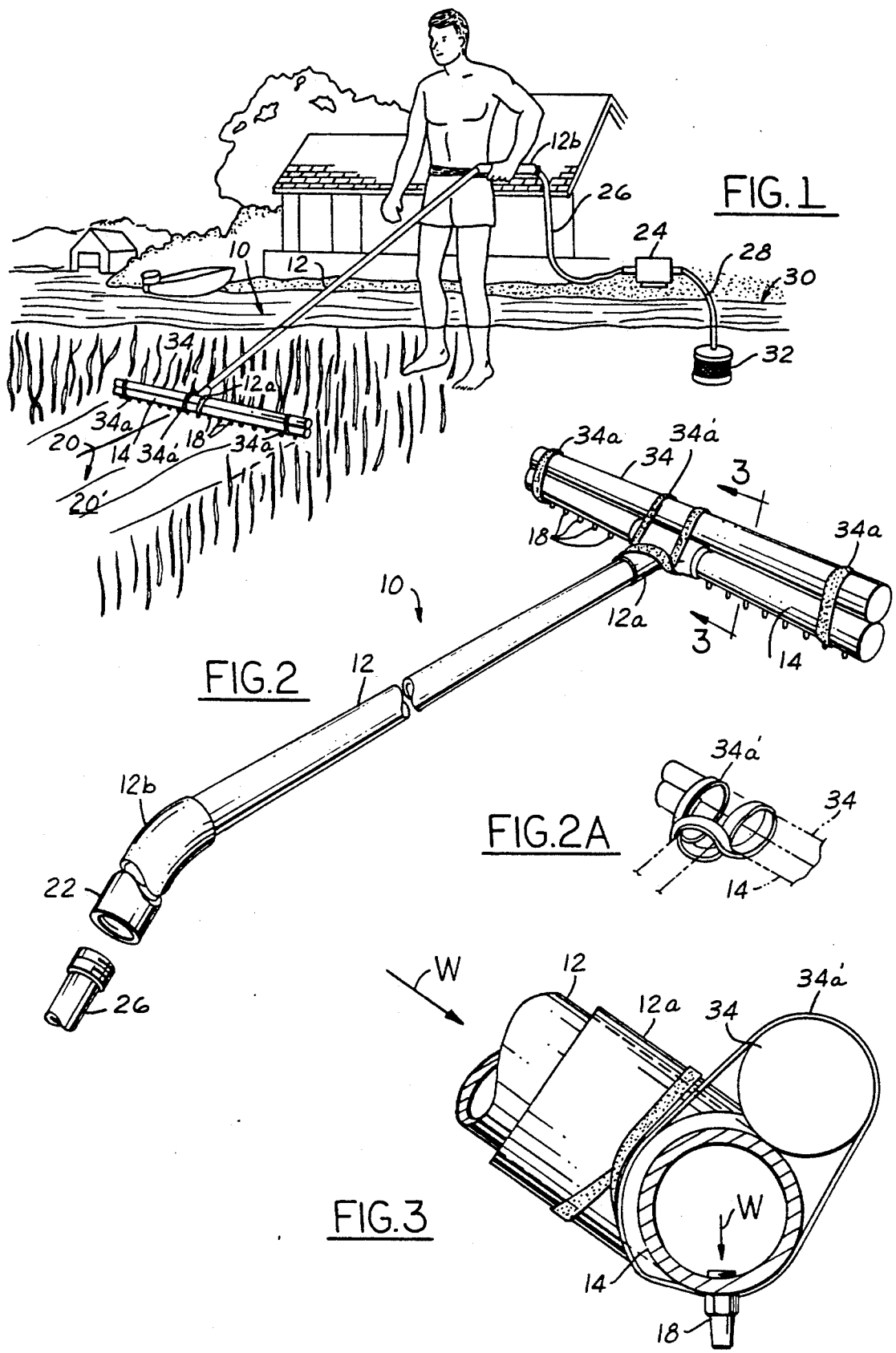

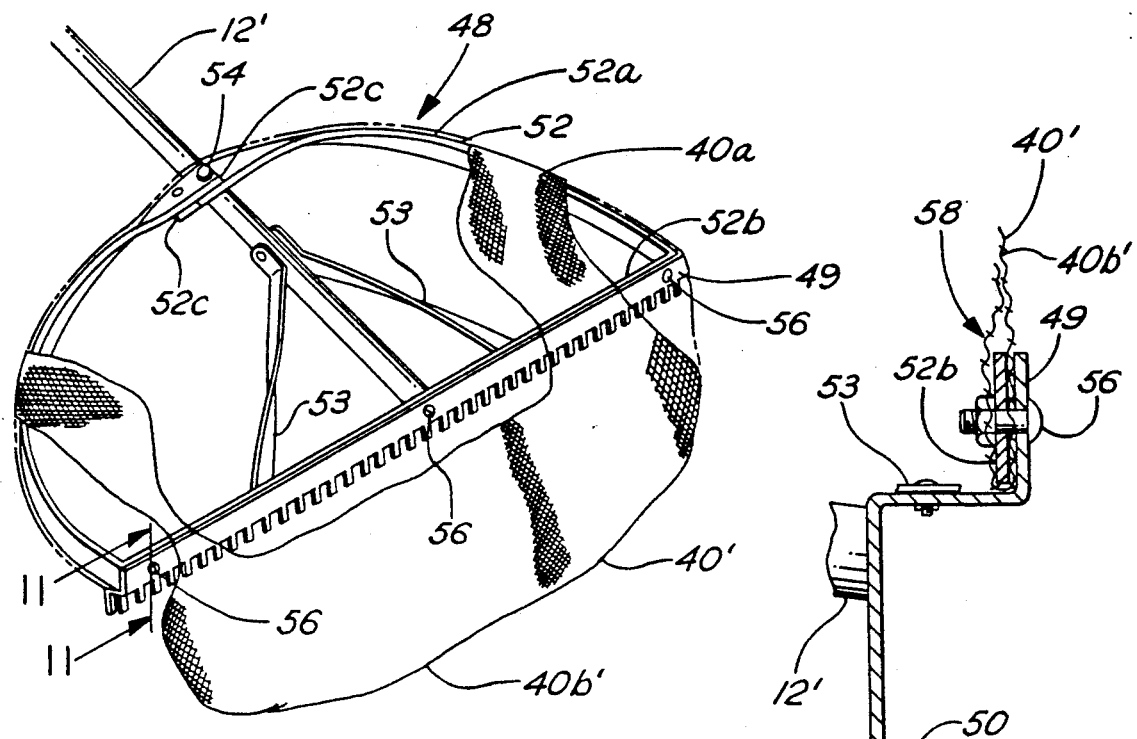
FIG.10
FIG.11
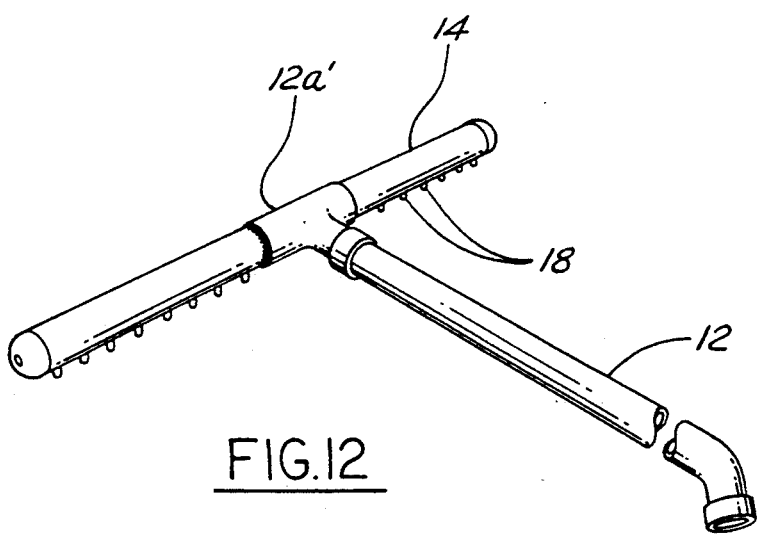
FIG.12

SYSTEM FOR UPROOTING AQUATIC PLANTS

CROSS-REFERENCE TO RELATED APPLICATIONS

The present application is a continuation-in-part application of copending application Ser. No. 07/740,715, filed Aug. 6, 1991 now U.S. Pat. No. 5,152,126.

BACKGROUND OF THE INVENTION

1. Field of the Invention

The present invention relates to devices for removing aquatic plants from lakes and ponds, and more particularly to a device for uprooting aquatic plants using a plurality of water jets directed into the soil bearing the plant roots.

2. Description of the Prior Art

A frequent problem of lakefront property owners is proliferation of choking underwater plants as the summer progresses. While aquatic plants serve an admittedly useful purpose with respect to the environmental balance of a body of water, over production of aquatic plants adjacent a property owner's shore impedes recreational use of the lake. The problem is more than just aesthetics: wading is unpleasant, boating can be impaired as propellers get caught in the plant beds and swimming may become impossible in plant infested areas. Left unchecked, it is even possible over a number of years for a bay of a lake or pond to become marsh, as the aquatic plants choke it off.

Accordingly, riparian property owners frequently must battle aquatic plant growth in order to preserve and enhance their property value and secure pleasurable enjoyment of the water. A number of techniques are available of varying cost, environmental hazard, and laboriousness; some are regulated by state law, requiring a permit before plant removal is attempted. Generally speaking, the common solutions to rid an area of undesirable aquatic plants are: harvest them, kill them, uproot them, shade them, trample them, introduce fish that eat them, or dredge the area and in so doing remove them.

Harvesting by machine requires very expensive equipment and usually requires permits and state agency supervision. Harvesting cuts the plants below the water surface and captures the plant cuttings on a moving conveyor belt. Many of the plant cuttings escape the conveyor belt and either float downwind to a beach or else sink, depending upon the type of plants. In either case, some of the clippings can re-root and start another plant. And, of course, the plants that were cut will continue to grow, only to be harvested again in an endless cycle.

Harvesting by hand using a rake and cutting tool has the same advantages of machine harvesting, in that plant clippings are removed. Of course, without a capturing device for the clippings, the plant cuttings will disperse and likely re-root, only to be thereafter cut another day. Again, the plants which have been cut continue to grow.

Uprooting the aquatic plants by hand raking is not effective at removing plants by the roots, and the process is far too laborious to be practical. Uprooting plants by hand pulling is slow, tedious, and extremely laborious.

Certain chemicals are effective, selective killers of aquatic plants. However, there are use restrictions, and permits are required. Chemicals can contaminate the environment, enter the food chain (including game fish), injure wildlife, restrict swimming and limit water use for drinking, lawn sprinkling and livestock watering. Because of the permits and regulations associated with chemicals, the average homeowner is unlikely to be able to purchase and use them. Of course, once the chemical has become neutralized, the plants will return and proliferate.

Shading aquatic plants until they die from lack of sunlight by means of opaque plastic sheets requires considerable installation time, and a considerable amount of plastic sheeting. Usually a permit is required, and the plastic sheets will interfere with recreational use of the water.

Trampling aquatic plants is effective in those select areas where considerable human traffic is common, such as public beach areas. The typical homeowner will not have sufficient activity to make this a viable reality.

Aquatic plant eating fish, such as the grass carp or white amur, are regulated for usage in many states. Management of the fish population of a body of water usually requires professional assistance and can be expensive. However, when properly managed, plant eating fish can be very effective in controlling aquatic plants.

Dredging requires specialized equipment which is professionally operated. While dredging is very effective, the effects associated with soil removal can adversely affect the lake environment, so this technique is usually highly regulated by state agencies; and the cost is extremely high.

While the foregoing techniques each offer some relief from the problems associated with aquatic plants, none is truly well suited for use by a private riparian property owner. Accordingly, what is needed is a simple, easy and effective device for ridding an area of lake bottom of undesirable aquatic plants, which is truly usable by a homeowner.

SUMMARY OF THE INVENTION

The present invention is a device, particularly well suited for use by a lakefront homeowner, which is structured to remove aquatic plants by sending a plurality of water jets into the soil, thereby causing uprooting of the plants.

The aquatic plant uprooter according to the present invention is composed of a hollow handle, a hollow discharge member connected at right angles to the handle, and a plurality of regularly spaced apart nozzles connected to the discharge member. A flexible hose connects a distal end of the handle to a water pump. The handle serves as a fluidic conduit for water from the pump to flow into the discharge member, which in turn, serves as a fluidic conduit for water from the handle to flow into the nozzles. The nozzles are structured, located and mutually spaced so that a jet of water emerges from each, which collectively disturbs the soil of a body of water so as to uproot aquatic plants in a swath across the discharge member by loosening their anchorage in the soil. The soil-freed plants may be directly accumulated in a collection net attached to the handle and discharge member, or may be collected by use of a separate rake-net system.

Accordingly, it is an object of the present invention to provide an aquatic plant uprooter which utilizes jets of water to eliminate, or at least greatly weaken, anchorage of the plant roots in relation to the soil, thereby freezing the plant from the lakebottom.

It is an additional object of the present invention to provide an aquatic plant uprooter which uses jets of water to uproot plants and is usable by a lakefront homeowner.

It is another object of the present invention to provide an aquatic plant uprooter which uses jets of water to uproot plants and further includes a net attachment to collect the plants as they are uprooted.

It is still another object of the present invention to provide an aquatic plant uprooter which uses jets of water to uproot plants and which is structured for being pulled or pushed across the lakebottom by a user.

It is a further object of the present invention to provide an aquatic plant uprooter which uses jets of water to uproot plants and which is inexpensive, efficient and effective for ridding a lake bottom of unwanted aquatic plants.

It is yet an additional object of the present invention to provide a rake-net device which permits a user to easily and effectively accumulate uprooted or harvested aquatic plant material from a body of water.

These, and additional objects, advantages, features and benefits of the present invention will become apparent from the following specification.

BRIEF DESCRIPTION OF THE DRAWINGS

FIG. 1 is a perspective view of the aquatic plant uprooter according to the present invention shown in operation by a lakefront homeowner.

FIG. 2 is a perspective view of the aquatic plant uprooter according to the present invention, shown with an external weight member.

FIG. 2a is a detail perspective view of a strap for connecting the external weight member to the discharge member of the present invention.

FIG. 3 is a detail, fragmentary, partly sectional side view of the discharge member of the aquatic plant uprooter designed primarily for a pull mode of operation.

FIG. 10 is a perspective view of a rake-net device having a collection net for collecting uprooted or harvested aquatic plants, showing a second form of structural configuration therefor.

FIG. 11 is a detail end view of the rake-net device, seen along lines 11—11 in FIG. 10.

FIG. 12 is a perspective view of the aquatic plant uprooter according to the present invention, in which the discharge member has inherent weight sufficient to obviate addition of a weight member thereto.

DETAILED DESCRIPTION OF THE PREFERRED EMBODIMENT

Figure 4:
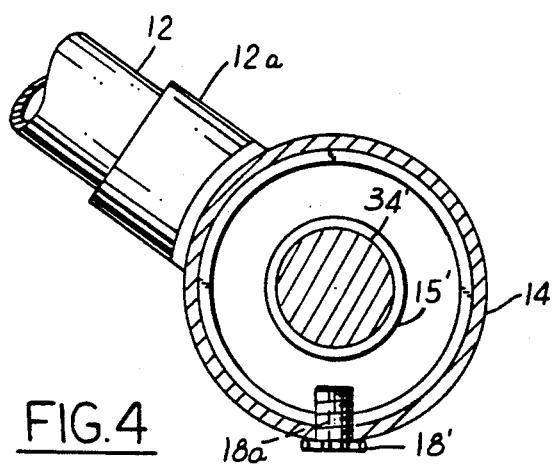
FIG. 4 is a detail, fragmentary, partly sectional side view of the discharge member of a variation of the aquatic plant uprooter which permits both push and pull modes of operation, and further shows an internal weight member.

Of all available methods of aquatic plant control, uprooting is preferred, as there is a minimum of ecological damage, growth is prevented, and regrowth can happen only in the event entirely new plants sprout. However, the exertion to manually uproot plants by extracting them from undisturbed soil is far too extreme to be practical for riparian homeowners. To solve this problem, the present invention is a device which uproots aquatic plants by use of water jets. According to the present invention, plants are uprooted by loss of supporting soil for the roots, resulting in separation of the plant from the soil.

Referring now to the drawing, FIG. 1 shows the aquatic plant uprooter 10 according to the present invention being used by an individual, in this case a riparian homeowner. It will be seen from the depiction that the aquatic plant uprooter 10 is composed of a handle 12 and a discharge member 14 connected perpendicularly at its middle to the forward end of the handle 12. A plurality of nozzles 18 are provided in a row aligned parallel with the cylindrical axis of the discharge member 14, being located thereon so as to be directed downwardly toward the lake bottom 20 when the handle 12 is held at an operational angle by a user of about 35 to 45 degrees relative to the lake bottom, as shown in FIG. 1. In this regard, the handle preferably includes a hand grip portion 12b for being held by the user which is oriented generally parallel to the water surface when the handle 12 is at the operational angle.

Both the handle 12 and the discharge member 14 are hollow, forming conjoining closed fluidic conduits for conducting water under pressure from the distal end 22 of the handle 12 to the nozzles 18. In this regard, it is preferred for these components to be of cylindrical cross-section. While circular cross-sections are preferred, it is also permissible for the discharge member 14 to be of an elliptical cross-section, with the nozzles located on a flatter portion of the surface curvature. An elliptical cross-section can have an advantage with respect to the ability for the discharge member to rest upon the soil rather than tending to bury into it during operation, as might happen with narrow circularly cross-sectioned discharge members. The handle and discharge member are constructed of a durable, noncorrosive material that can withstand operation internal fluid pressures of around 20 to 60 p.s.i. or higher, such as for instance PVC, corrosion protected steel or iron, stainless steel, etc. In order that the handle be rigidly affixed to the discharge member, it is preferred for the handle 12 to interconnect with the discharge member 14 by means of a saddle shaped joint member 12a that is, itself, connected with the discharge member. A tee joint member 12a' or other related joint member well known in the plumbing arts could be used as well for this purpose. Alternatively, the handle 12 may be directly connected with the discharge member 14, such as by welding. The interconnection between the discharge member 14 (or the joint member) and the handle 12 may be by threads, adhesive, welding or other suitable means. In any event, the connection structure is to be selected so as to hold the handle 12 and the discharge member 14 rigidly together and be leak tight when internal fluid pressure is present therein.

Figure 5:
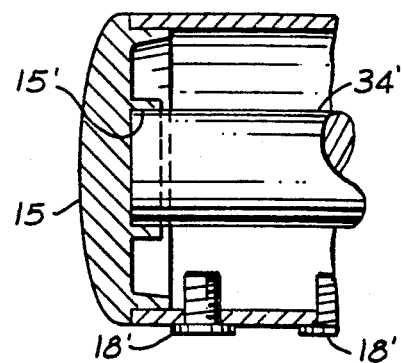
FIG. 5 is a detail, fragmentary, partly sectional front view of the aquatic plant uprooter shown in FIG. 4.

Since it is important that the discharge member does not move upwardly away from the lake bottom 20 when water jets exit from the nozzles 18 upon actuation of a water pump (described hereinbelow), the discharge member must be heavy enough. If the discharge member 14 is intrinsically heavy because it is constructed of a heavy material such as corrosion protected steel, corrosion protected iron, stainless steel, and the like, as shown in FIG. 12, then no additional weight is required. However, if the discharge member 14 is constructed of a light material, such as PVC, then a weight must be added thereto, either in the form of an external weight member 34 or an internal weight member 34'. Any heavy materials can be used for the external and internal weight members 34, 34', such as lead or plastic coated cast iron. The external weight member 34 is preferred to be connected externally to the discharge member 14 by straps 34i a and 34a', as shown in FIGS. 1 through 3, but other connection means are acceptable. For example, an external weight member 34 could be in almost any form, such as diver's weights connected on the discharge member by a strap, external sleeves which slip onto each side of the discharge member, or some sort of weight connected with the handle adjacent the general area of the connection location thereof with the discharge member. The internal weight member 34' is preferably connected internally to the discharge member 14, as shown in FIGS. 4 and 5. In this regard, either end of the internal weight member 34' seatably abuts a seat 15' in each closed end cap 15 of the discharge member 14. Other connection means are acceptable for the internal weight member 34'. For example, the internal weight member may slide on an internal tube within the discharge member, or may be glued, welded, or otherwise connected to the discharge member. It is preferred that each of the external and internal weight members 34, 34' be replaceable so that more or less weight can be used in relation to the force generated by the jets, as per a selected water pump, to thereby ensure that the discharge member remains adjacent the soil during operation without an undue amount of forceful manipulation by the user. The weight may also be adjusted to suit a user's preference for deeper penetration of the discharge member into the soil during operation, which can be afforded by heavier weight. It is preferred for each of the external and internal weight members 34 to be co-extensive with the discharge member 14, as shown in FIGS. 1 and 2, although this is not a requirement. As mentioned hereinabove, when the discharge member 14 is itself sufficiently heavy, as shown in FIG. 12, no weight member either internal or external, is needed. Accordingly, the aquatic plant uprooter 10 as shown in FIG. 12 is most preferred.

The nozzles 18 are preferred to be constructed of metal, such as brass. The nozzles are preferred to partly protrude from the discharge member, as shown in FIGS. 2 and 3. Alternatively, non-protruding nozzles 18' may be preferably used, the nozzles being seated within the discharge member, a shown in FIG. 4. Partly protruding nozzles afford an advantage of deeper water jet penetration into the soil, and a further advantage of some plant and soil agitation, as the nozzles act as tines. Of course, the nozzles must be structurally strong in order to accommodate the forces associated with physical interactions, if protruding nozzles are utilized.

A water pump 24 is fluidically connected by a flexible discharge hose 26. The discharge hose 26 is in turn threadably connected to the distal end 22 of the handle 12. An intake hose 28 fluidically connects the intake of the water pump 24 to the body of water 30. It is preferred for the intake hose 28 to include a filtration member 32 at its intake end.

The following two examples of specifications of an aquatic plant uprooter are presented only by way of example information, since other specifications are acceptable. Example one; see FIG. 1: The handle 12 and discharge member 14 are constructed of PVC conduit having a 1.5 inch diameter. The handle has a length of about 5 feet, while the discharge member has a length of about 3 feet. Nozzles 18 each have an internal diameter of 3/16 inch, are spaced along the entire length of the discharge member at 1.5 inches apart on center, and are of the protruding type, extending outwardly from the discharge member about one-half inch. A suitable external weight member 34 is connected with the discharge member. The water pump 24 has a 2.5 H.P. motor and the pump is of the centrifugal type, rated at 5,700 gallons-per-minute at 20 p.s.i. (an example of such a water pump is that typically used by riparian homeowners for watering their lawns). Example two (which is most preferred); see FIG. 12: The handle 12 and discharge member 14 are constructed of a corrosion protected steel pipe having a 1.5 inch diameter. The handle has a length of about 5 feet, while the discharge member has a length of about 3 feet. Nozzles 18 each have an internal diameter of 3/16 inch, are spaced along the entire length of the discharge member at 1.5 inches apart on center, and are of the protruding type, extending outwardly from the discharge member about one-half inch. The discharge member is inherently sufficiently heavy so no separate weight member is connected with the discharge member. The water pump 24 has a 2.5 H.P. motor and the pump is, again, of the centrifugal type, rated at 5,700 gallons-per-minute at 20 p.s.i.

Figure 6:
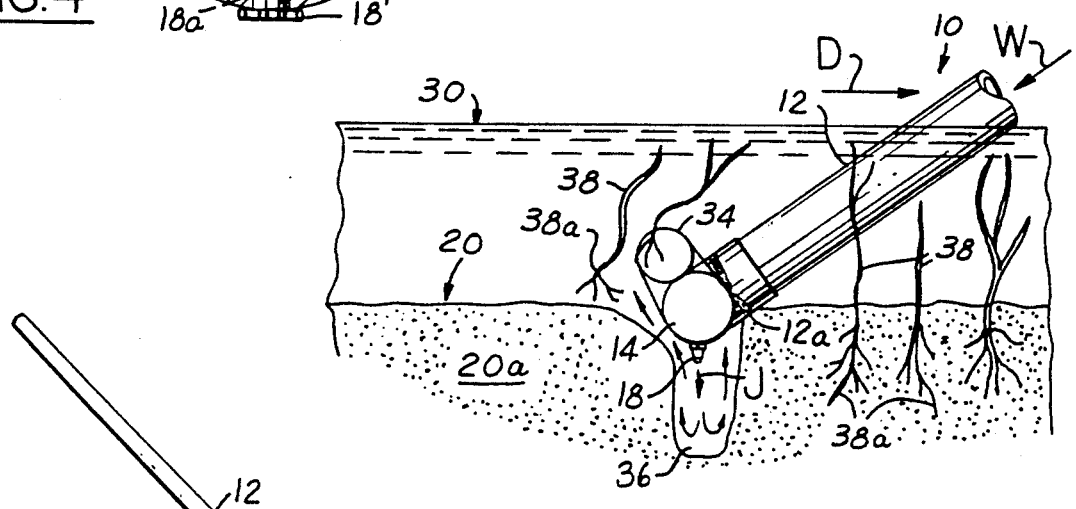
FIG. 6 is a side view of the aquatic plant uprooter according to the present invention, shown in operation adjacent a lake bottom in the process of uprooting aquatic plants.

With reference now being directed to the combination of FIGS. 1 and 6, operation of the aquatic plant uprooter will now be detailed.

The user grabs the hand grip 12b and places the discharge member adjacent the lake bottom 20 with the nozzles 18 pointing directly down thereinto. The water pump 24 is thereupon actuated, causing pressurized water W to flow through the handle and discharge member and then emerge as a water jet J from each of the nozzles 18. The water jets churn the soil 20a of the lake bottom 20, undermining the roots by forming a pocket 36 of very loose soil and water, thereby causing the roots 38a of aquatic plants 38 to be freed from the soil 20a (or freed with very little mechanical assist) and then be collected. As can be discerned by reference to FIG. 1, a relatively plant free region 20' in the lake bottom 20 is produced after the discharge member 14 has been passed over that portion of the lake bottom. In this regard, discharge members of narrow cross-section, on the order of 1.5 to 2 inches, may be used by being pulled from a first position away from the user toward the user (direction D in FIG. 6). In this scenario of operation, the user may move the discharge member relative to the lakebottom by walking or by serial step of walking then stopping and then pulling by the handle. Narrow cross-sectioned discharge members have a tendency to dig into the soil if pushed away from the user. A wide cross-sectioned discharge member, on the order of 4 or more inches, may be used by either pulling toward the user or pushed away from the user across the lakebottom 20. In any event, it is important not to move the discharge member too quickly lest the soil not be sufficiently disturbed as to free the pesky plants, but not so slow that the nozzles dig into the soil so as to bury the discharge member thereinto.

The weight of the discharge member in combination with the handle, nozzle diameter, nozzle spacing, diameter of the discharge member, and water pump head pressure and flow rate are all coordinated so that the discharge member 14 can pass directly over an area of the lakebottom, as depicted in FIG. 6, and thereupon disturb the soil so as to free the plant roots from the soil. It is preferred to use only so much pressure as is necessary to loosen the plant roots from the soil so that they are easily uprooted. In this regard, pressure of between 20 to 60 p.s.i. are preferred, and pressures around 20 p.s.i. are most preferred. Higher pressures tend to result in soil blasting which risks unnecessary environmental damage to the lakebottom soil, while pressures too low will not be sufficient for the water jets to churn the soil so as to undermine the roots of the aquatic plants; the preferred operation pressure is within these two extremes.

While the description of operation hereinabove pertains to an individual standing in the water or the adjacent shore, it is also possible to operate the aquatic plant uprooter 10 from a boat or other platform over the water, such as a dock. It is further possible to mount the water pump 24 to a floating platform or position it in a boat or upon some other platform over the water. Further in this regard, it is possible for the aquatic plant uprooter to be constructed on a much larger scale for aquatic plant uprooting of extensive sections of a lakebottom using appropriate support machinery such as a boat mounted derrick. It is still further possible for the handle 12 to be composed of mutually telescoping components, threadably interconnected segments, or simply be in the form of a sufficiently long handle so that operation from a boat, a dock or the shore is facilitated.

Once the aquatic plants have been freed from the soil of the lakebottom by operation of the aquatic plant uprooter 10, the next problem to be solved is collecting the plants. One solution is to let water currents carry them away, but this is unsound and unrealistic. To ensure that neighbors are happy and that floating uprooted plants cannot later re-root, they must be collected and carried to a disposal site.

Figure 7:
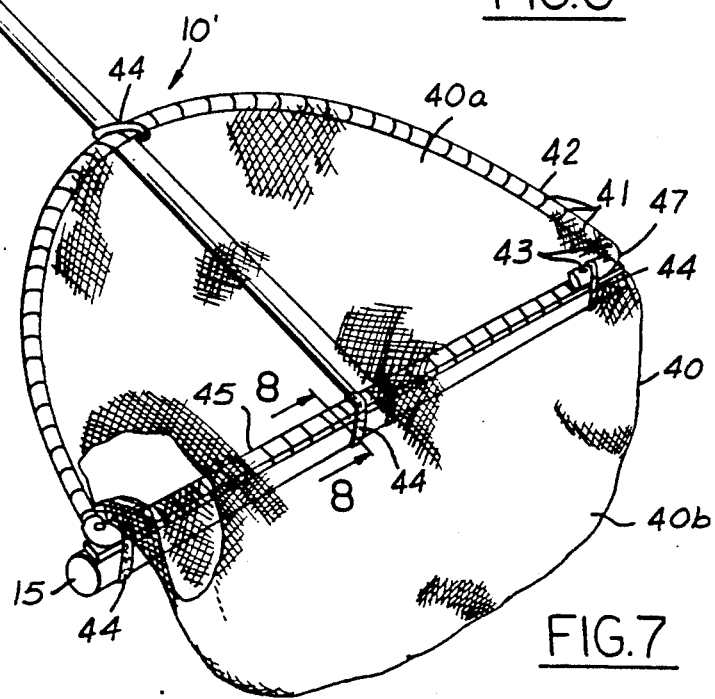
FIG. 7 is a perspective view of the aquatic plant uprooter according to the present invention, showing further a collection net for collecting uprooted aquatic plants.
Figure 8:
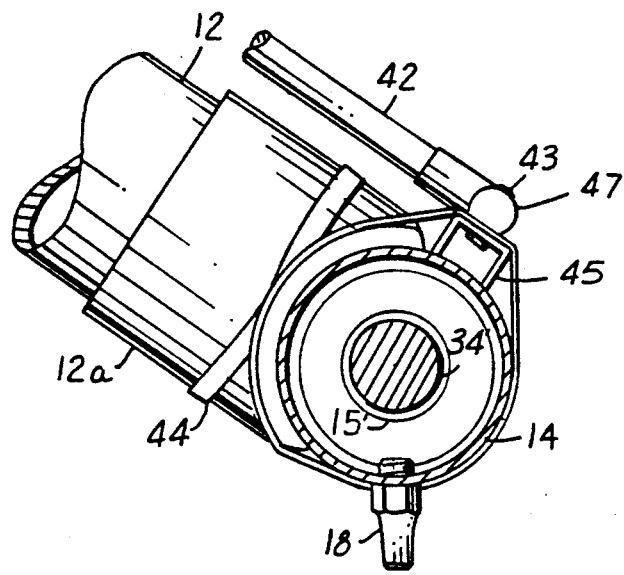
FIG. 8 is a detail, fragmentary, partly sectional side view of the discharge member of the variation of the aquatic plant uprooter, seen along lines 8—8 in FIG. 7.

As single step approach to aquatic plant removal is to equip the aquatic plant uprooter 10' with a net for collecting loosened plants. In this regard, a frame structure is employed which connects with the handle 12 and the discharge member 14 for supportably holding a net. As an example of a suitable structure, FIGS. 7 and 8 depict a semi-circular brace 42 and a channel member 45 which runs along the top of the discharge member 14 (the internal form of weight member 34' being employed). The semi-circular brace 42 includes elbows 47 which are connected with the channel member 45 by means of common fasteners 43. The apex of the semi-circular brace is connected to the handle by a strap 44 and the channel member is connected to the discharge member also by straps 44. The net 40 is sewn to the semi-circular brace and the channel member and is slung over the discharge member opposite the nozzles 18, so as to have an opening portion 40a for collecting plants located between the semi-circular brace 42 and the discharge member, and an accumulation portion 40b for holding collected plants located forwardly of the discharge member (in a direction away from the handle). It is to be noted that the foregoing structural description is by way of example only; other frame structures and net connections thereto are possible, such as that depicted in FIGS. 10 and 11.

In operation, as plants are uprooted, the net collects them and accumulates them for later disposal. This aquatic plant uprooter 10' is preferred for use when there are relatively few plants to be uprooted, such as maintenance of a previously uprooted lakebottom area.

Alternatively, the user may want to employ a two step approach to ridding his/her riparian property of aquatic plants, particularly where there is a high density of plants in the area. In this case, the aquatic plant uprooter 10 of FIG. 1 is utilized, followed by a separate collecting operation using a rake-net device 48 having a rake, a frame connected with the rake and a net connected with the frame. Two examples of rake-net structures are depicted in FIG. 9 and FIGS. 10 and 11; these are exemplar only and not intended to be structurally limiting.

Figure 9:
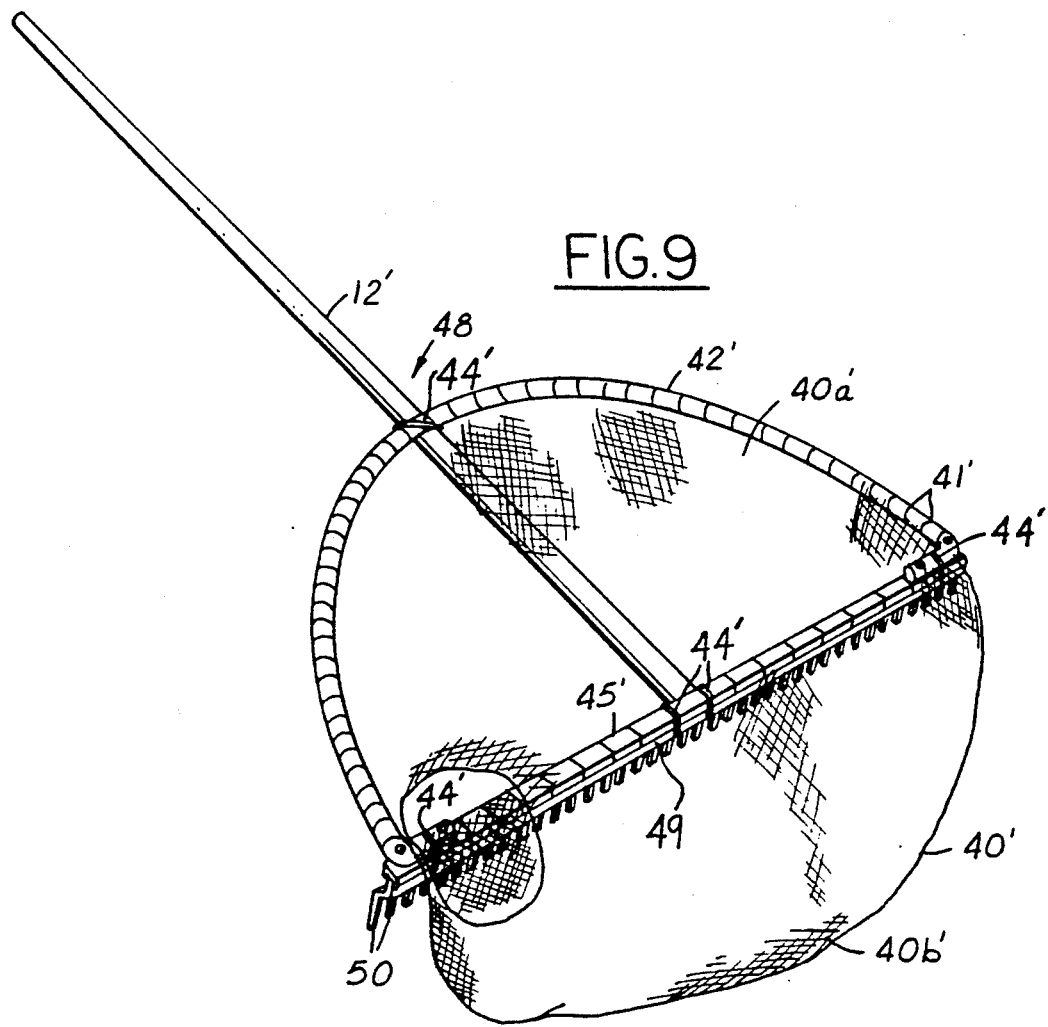
FIG. 9 is a perspective view of a rake-net device having a collection net for collecting uprooted or harvested aquatic plants, showing one form of structural configuration therefor.

In the structural example shown in FIG. 9, a handle 12' connects with a perpendicularly oriented cross-member 49 which supports a plurality of rake tines 50. As in the net structure depicted in FIGS. 7 and 8, a semi-circular brace 42' connects with a channel member 45', and the semi-circular brace and channel member connect to the handle and the cross-member by means of straps 44'. A replaceable net 40' has a collection portion 40a' and an accumulation portion 40b' and is attached in the manner described above with respect to FIGS. 7 and 8.

In the structural example shown in FIGS. 10 and 11, a handle 12' connects with a perpendicularly oriented cross-member 49 which supports a plurality of rake tines 50. It is preferred, but not required, for cross-braces 53 to be connected with the handle 12' and the cross-member 49 for adding structural stability therebetween. A frame 52 has a straight portion 52b and a semi-circular portion 52a (of course, portion 52a can be other than semi-circular in shape). The frame 52 is preferably of a single piece construction having two ends 52c which overlappingly connect together at the location where a fastener 54 attaches the frame to the handle 12'. The straight portion 52b of the frame 52 is attached to the cross-member 49 by a plurality of fasteners 56. A preferred frame material is a single piece aluminum strap, but other materials are also permissible and the frame can be in more than one piece. A replaceable net 40' has a collection portion 40a' and an accumulation portion 40b' and is attached to the frame by operation of an edge loop 58 which is threaded onto the frame starting at one of the ends 52c thereof so as to spread-out over both the straight and semi-circular portions of the frame 52.

In operation the tines stir-up the soil and rake the aquatic plants, while the net collects and stores then for later disposal.

To those skilled in the art to which this invention appertains, the above described preferred embodiment may be subject to change or modification. For instance, the net can be made out of various materials. Such change or modification can be carried out without departing from the scope of the invention, which is intended to be limited only by the scope of the appended claims.

What is claimed is:

1. A device for uprooting aquatic plants, wherein the aquatic plants possess roots which provide anchorage therefor into soil located beneath a body of water, said device being provided with a source of pressurized water, said device comprising:
   a handle having a forward end and an opposite distal end, said handle being of elongate shape and of hollow construction forming a fluidic conduit from said forward end to said distal end thereof;
   means for connecting said distal end of said handle to the source of pressurized water;
   a discharge member having a first end and an opposite second end, said discharge member being connected to said forward end of said handle at a location on said discharge member substantially midway between said first and second ends thereof, said discharge member being of elongate shape and of hollow construction forming a fluidic conduit between said first and second ends thereof, said discharge member being oriented substantially perpendicularly with respect to said handle, said fluidic conduit of said discharge member fluidically communicating with said fluidic conduit of said handle, said discharge member having a cylindrical axis; and
   a plurality of nozzles connected with said discharge member and arranged in a row parallel to the cylindrical axis between said first and second ends of said discharge member, said plurality of nozzles fluidically communicating with said fluidic conduit of said discharge member;
   wherein the source of pressurized water provides a flow of pressurized water into said distal end of said handle, through said fluidic conduit of said handle, out said forward end of said handle and into said fluidic conduit of said discharge member, and thereupon into said plurality of nozzles so as to produce a water jet exiting from each nozzle of said plurality of nozzles; said discharge member in combination with said handle having a predetermined amount of weight such that said discharge member is thereby kept adjacent the soil when said water jet exits from each said nozzle; said water jet exiting each said nozzle having a predetermined pressure and water flow rate so as to undermine soil anchorage of the roots of the aquatic plants.

2. The device of claim 1, further comprising net means connected with said handle and said discharge member for collecting the uprooted aquatic plants.

3. The device of claim 2, wherein said net means comprises:
   frame means connected with said handle and discharge member for providing a support structure having a predetermined shape; and
   a net connected with said frame means, said net having an opening portion for receiving aquatic plants defined by said frame means, said net further having an aquatic plant accumulation portion located forwardly of said frame means in a direction away from said handle.

4. The device of claim 2, wherein a portion of each nozzle of said plurality of nozzles protrudes outwardly from said discharge member.

5. The device of claim 2, wherein each nozzle of said plurality of nozzles is substantially located within said discharge member.

6. A system for uprooting aquatic plants, wherein the aquatic plants possess roots which provide anchorage therefor into soil located beneath a body of water, said system comprising;
   a handle having a forward end and an opposite distal end, said handle being of elongate shape and of hollow construction forming a fluidic conduit from said forward end to said distal end thereof;
   water pump means for providing a flow of pressurized water by pumping water from the body of water and delivering the pressurized water to said distal end of said handle;
   a discharge member having a first end and an opposite second end, said discharge member being connected to said forward end of said handle at a location on said discharge member substantially midway between said first and second ends thereof, said discharge member being of elongate shape and of hollow construction forming a fluidic conduit between said first and second ends thereof, said discharge member being oriented substantially perpendicularly with respect to said handle, said fluidic conduit of said discharge member fluidically communicating with said fluidic conduit of said handle, said discharge member having a cylindrical axis; and
   a plurality of nozzles connected with said discharge member and arranged in a row parallel with the cylindrical axis between said first and second ends of said discharge member, said plurality of nozzles fluidically communicating with said fluidic conduit of said discharge member;
   wherein said water pump means provides a flow of pressurized water into said distal end of said handle, through said fluidic conduit of said handle, out said forward end of said handle and into said fluidic conduit of said discharge member, and thereupon into said plurality of nozzles so as to produce a water jet exiting from each nozzle of said plurality of nozzles; said discharge member in combination with said handle having a predetermined amount of weight such that said discharge member is thereby kept adjacent the soil when said water jet exits from each said nozzle; said water jet exiting each said nozzle having a predetermined pressure and water flow rate so as to undermine soil anchorage of the roots of the aquatic plants.

7. The system of claim 6, further comprising a rake-net for collecting uprooted aquatic plants, said rake-net comprising:
   a handle;
   tine means connected with said handle for providing a plurality of mutually connected tines;
   frame means connected with said handle and said tine means for providing a support structure having a predetermined shape; and
   a net connected with said frame means, said net having an opening portion for receiving aquatic plants defined by said frame means, said net further having an aquatic plant accumulation portion located forwardly of said frame means in a direction away from said handle.

8. The system of claim 7, wherein said tine means comprises:
   a cross-member having a first end and an opposite second end, said cross-member member being connected to said forward end of said handle at a location on said cross-member substantially midway between said first and second ends thereof, said cross-member being oriented substantially perpendicularly with respect to said handle; and a plurality of substantially regularly spaced apart tines connected to said cross-member.

9. The system of claim 6, further comprising net means connected with said handle and said discharge member for collecting the uprooted aquatic plants.

10. The system of claim 9, wherein said net means comprises:

frame means connected with said handle and discharge member for providing a support structure having a predetermined shape; and a net connected with said frame means, said net having an opening portion for receiving aquatic plants defined by said frame means, said net further having an aquatic plant accumulation portion located forwardly of said frame means in a direction away from said handle.

11. The system of claim 10, wherein a portion of each nozzle of said plurality of nozzles protrudes outwardly from said discharge member.

12. The system of claim 11, wherein each nozzle of said plurality of nozzles is substantially located within said discharge member.

* * * * *

UNITED STATES PATENT AND TRADEMARK OFFICE
CERTIFICATE OF CORRECTION

PATENT NO. : 5,305,585
DATED : April 26, 1994
INVENTOR(S) : Ronald J. Cousineau

It is certified that error appears in the above-identified patent and that said Letters Patent is hereby corrected as shown below:

At Column 6, line 23 thereof, at the beginning of the line, delete "lons-per-minute" and insert therefor —lons-per-hour—.

At Column 6, line 39 thereof, after "rated at 5,700" delete "gallons-per-minute" and insert therefor —gallons-per-hour—.

Signed and Sealed this

Fourth Day of October, 1994

Attest:

BRUCE LEHMAN

Attesting Officer

Commissioner of Patents and Trademarks